United States Patent
Guthrie

(10) Patent No.: US 9,770,990 B2
(45) Date of Patent: Sep. 26, 2017

(54) ENERGY GENERATING AND STORAGE SYSTEM FOR ELECTRIC VEHICLE

(71) Applicant: Billy G. Guthrie, McCleansboro, IL (US)

(72) Inventor: Billy G. Guthrie, McCleansboro, IL (US)

(*) Notice: Subject to any disclaimer, the term of this patent is extended or adjusted under 35 U.S.C. 154(b) by 218 days.

(21) Appl. No.: 14/694,405

(22) Filed: Apr. 23, 2015

(65) Prior Publication Data
US 2016/0311331 A1    Oct. 27, 2016

Related U.S. Application Data

(60) Provisional application No. 61/982,920, filed on Apr. 23, 2014.

(51) Int. Cl.
*B60L 1/00* (2006.01)
*B60L 11/18* (2006.01)

(52) U.S. Cl.
CPC ....... *B60L 11/1809* (2013.01); *Y02T 10/7005* (2013.01); *Y02T 10/92* (2013.01)

(58) Field of Classification Search
CPC .................................................. B60L 11/1809
USPC ......................................................... 307/10.1
See application file for complete search history.

(56) References Cited

U.S. PATENT DOCUMENTS

| 7,215,037 B2* | 5/2007 | Scalzi | B60K 16/00 290/44 |
|---|---|---|---|
| 8,410,628 B1* | 4/2013 | Suaya | F03D 3/002 290/44 |
| 2010/0006351 A1* | 1/2010 | Howard | B60L 8/006 180/2.2 |

* cited by examiner

*Primary Examiner* — Jared Fureman
*Assistant Examiner* — Duc M Pham
(74) *Attorney, Agent, or Firm* — Gary K. Price

(57) ABSTRACT

An energy generating and storage system used with an electric vehicle, having batteries, and at least one accumulator charging means connected to the batteries. The accumulator charger includes at least one alternator or generator and air induction turbines. Each air induction turbine includes a free-wheeling member in induction communication with the alternator or generator. Rotation of the free-wheeling members results in rotation of a rotating member in communication with the alternator or generator for producing electrical energy. The air induction turbines are preferably mounted at a front-end location of the vehicle, such as the vehicle's front grill. Air flowing through the free-wheeling members results in rotation of the free-wheeling members and production of the electric energy supplied to the vehicle's motor.

15 Claims, 7 Drawing Sheets

ENERGY GENERATING AND STORAGE SYSTEM FOR ELECTRIC VEHICLE

CROSS REFERENCES TO RELATED APPLICATIONS

U.S. Provisional Application for Patent No. 61/982,920, filed Apr. 23, 2014, with title "Energy Generating and Storage System for Electric Vehicle" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention relates generally to electric vehicles and the like, and more particularly to improvements in energy generating systems for maintaining normal operating power levels of the principal energy sources of electric vehicles by utilizing the kinetic energy generated by the moving vehicle.

2. Brief Description of Prior Art

While the gasoline engine has been the primary power source for vehicles for many years, the energy problems being encountered throughout the world has caused a resurgence of interest in various energy sources as alternatives to petroleum and in recent years increasing development efforts have been undertaken in all aspects of electric energy as a prime mover for vehicles.

Such developments have produced stronger, light weight vehicles using new materials and improved, long-life rechargeable batteries substantially extending vehicle operating ranges. This objective of extending vehicle operating ranges is recognized as an essential goal to achieve wide consumer acceptance of electric powered vehicles, and to that end the need is also recognized for improvements in electric power generating systems for such electric storage batteries to thereby minimize or eliminate the need for long battery-recharging periods now required.

The present invention is to provide an electric energy generation system for substantial recovery of electric energy and recharging of the principal storage battery so as to eliminate the need for supplemental or auxiliary gasoline or like prime movers and minimize the need for recharging from external power sources.

Accordingly, it is desirable to provide an energy generating and storage system for electric vehicles which overcome the disadvantages of the prior art listed above. In this regard, the present invention discloses an energy generating and storage system for electric vehicles which is efficient in operation, and which allows the electric vehicle to be driven a considerable distance between battery charges, without the need for supplemental or auxiliary gasoline.

SUMMARY OF THE INVENTION

An energy generating and storage system used in association with an electric vehicle. The system generally includes at least one battery, and at least one accumulator charger connected to the at least one battery. Each of the at least one accumulator chargers include a plurality of alternators or generators and first and second air induction turbines. Each of the air induction turbines include a free-wheeling member that is in induction communication with the alternators or generators. Rotation of the free-wheeling members results in rotation of a rotating member in communication with each of the alternators or generators for producing electrical energy for recharging the batteries to run the vehicle's motor. The at least one battery receives the electric energy from the alternators or generators and supplies driving energy to the vehicle's motor.

The air induction turbines are preferably mounted at a front-end location of the vehicle, such as the vehicle's front grill. Air flowing through the free-wheeling members results in rotation of the free-wheeling members and production of the electric energy supplied to the vehicle's motor. Generation of air flow is accomplished by driving the vehicle or by the vehicle facing a strong wind in the parked position.

DESCRIPTION OF THE PREFERRED EMBODIMENT

The system of the present invention is directed to an energy generating and storage system used in association with an electric vehicle. The system provides an improved electric vehicle which is efficient in operation, and capable of being driven a considerable distance between battery charges. More particularly, the present invention utilizes the kinetic energy generated by the moving vehicle, physically accumulating the kinetic energy to utilize, for example, starting the engine. In the broadest context, the energy generating and storage system for an electric vehicle of the present invention consists of components and configured and correlated with respect to each other so as to attain the desired objective.

Figure 1:
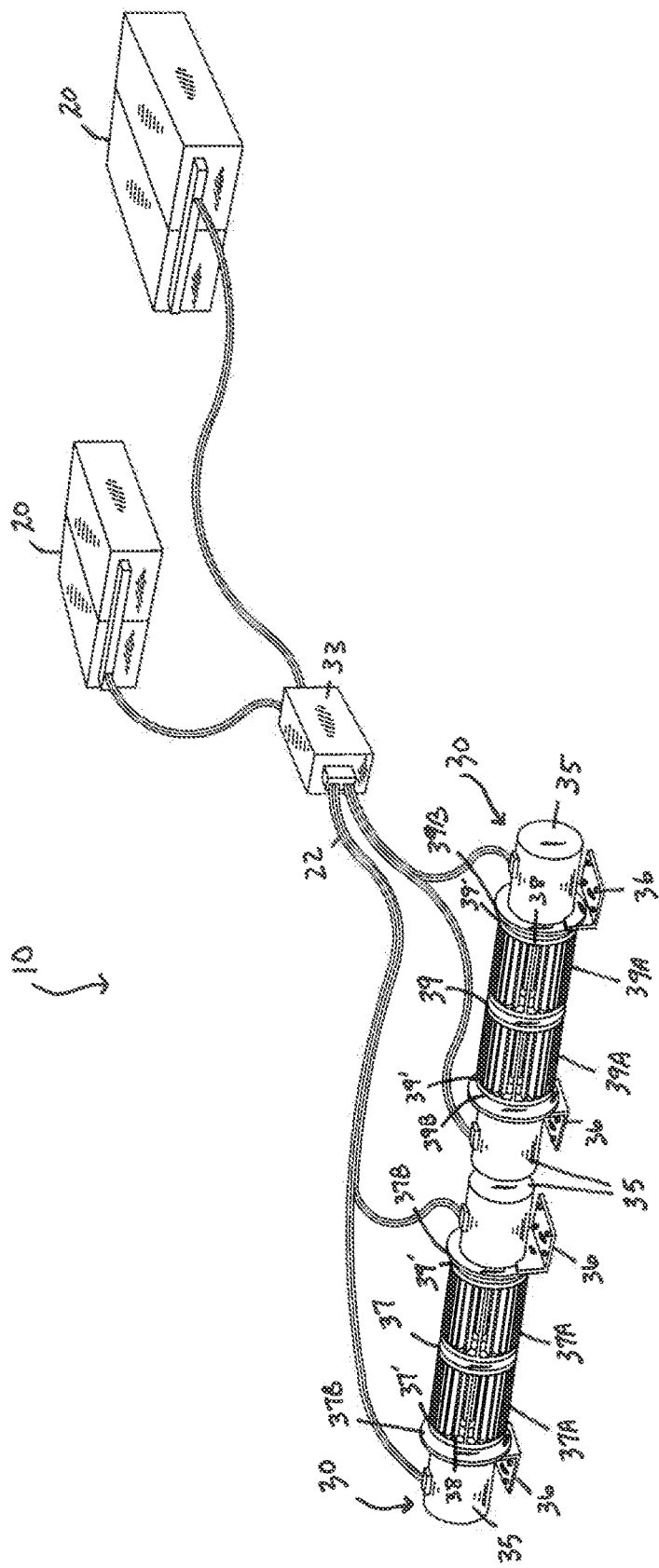
FIG. 1 is a perspective view of the preferred embodiment of the present invention, an energy generating and storage system for electrical vehicle.

Referring to FIG. 1 of the drawings, the energy generating and storage system for electric vehicle, designated as numeral 10, of the present invention is illustrated. The system 10 includes a source of energy from preferably, at least one battery 20. As will be understood, during operation the vehicle preferably can draw energy from a first of the at least one battery while any remaining battery(s) 20 is charging.

The system 10 is further provided with at least one accumulator charger generally designated as numeral 30 that is appropriately connected to the batteries 20 with electrical wires 22. Each of the at least one accumulator chargers 30 includes a plurality of alternators or generators 35 and at least one air induction turbine 37, 39. For purposes of illustration, the drawings may show two (2) induction turbines designated as numerals 37 and 39. The at least one charger 30 to permit a recharging of the at least one battery 20 when the vehicle is in operation.

As illustrated, an alternator or generator 35 is preferably disposed at ends 37', 39' of the at least one turbine 37, 39, respectively. Each of the alternators or generators 35 for converting mechanical energy generated as will be discussed to electrical energy to recharge the batteries 20 to continue to run the vehicle's motor. The alternators or generators are turned on or off associated with the rotation of the air induction turbines' free-wheeling members as will be described.

As stated, each of the air induction turbines 37, 39 include at least one free-wheeling member designated 37A, 39A, respectively. The at least one free-wheeling member 37A is in induction communication 37B with the alternators or generators 35 disposed at ends 37' of the charger 30, and, the free-wheeling member 39A is in induction communication 39B with the alternators or generators 35 disposed at the ends 39'. As will be understood, rotation of the free-wheeling members 37A, 39A result in rotation of a rotating member 37C, 39C, respectively, in communication with each of the alternators or generators 35 for producing electrical energy to recharge the batteries to run the vehicle's 100 motor.

Figure 3:
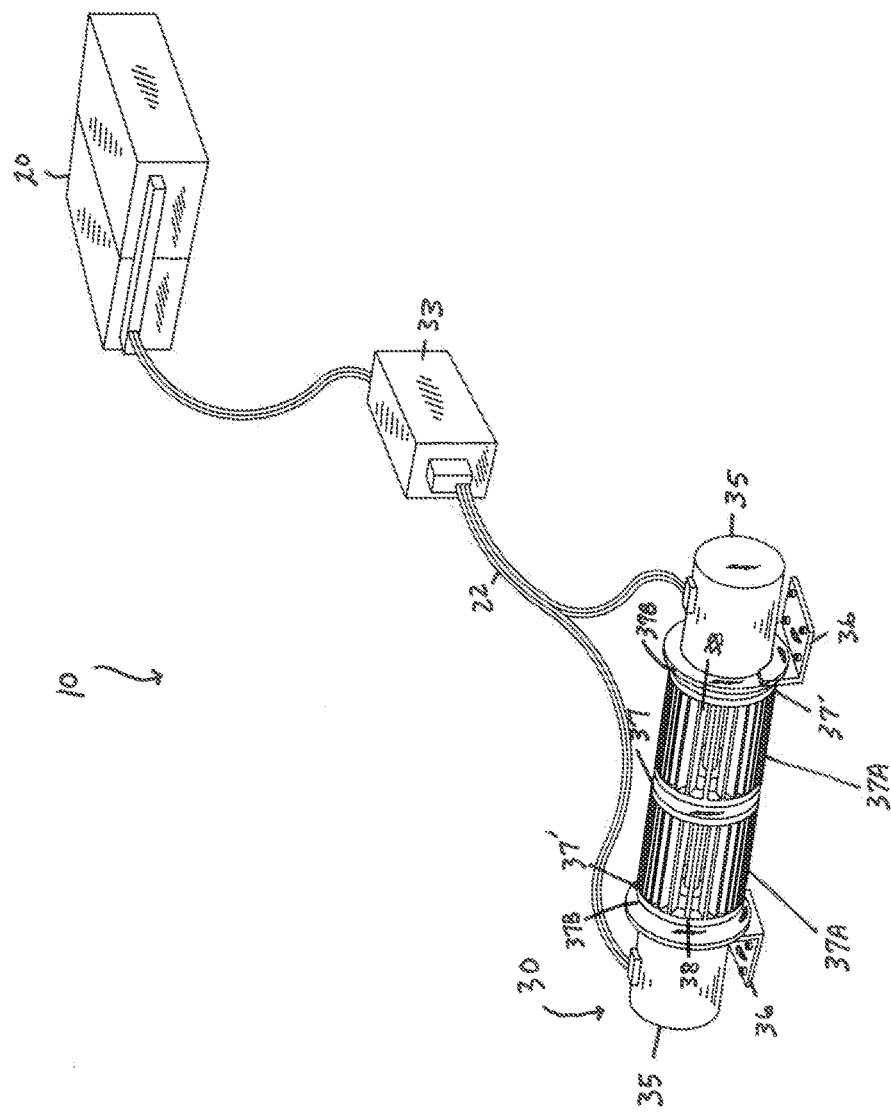
FIG. 3 shows the energy generating and storage system having a single accumulator charger and battery.

As best shown in FIG. 3, which illustrates induction turbine 37, each of the free-wheeling members 37A include a plurality of vanes 38, each vane 38 defines a planar surface 38A that extends radially inwardly and is substantially coplanar to the length L (FIG. 4) of the member 37A. It is understood that the elements on the induction turbine 37 as described are identical with the elements for induction turbine 39.

The system 10 includes known means to convert the kinetic energy of the rotating members 37A, 39A into electric energy. The batteries 20 receive the electric energy from the alternators or generators 35 and supply driving energy to the vehicle's motor 100.

Figure 4:
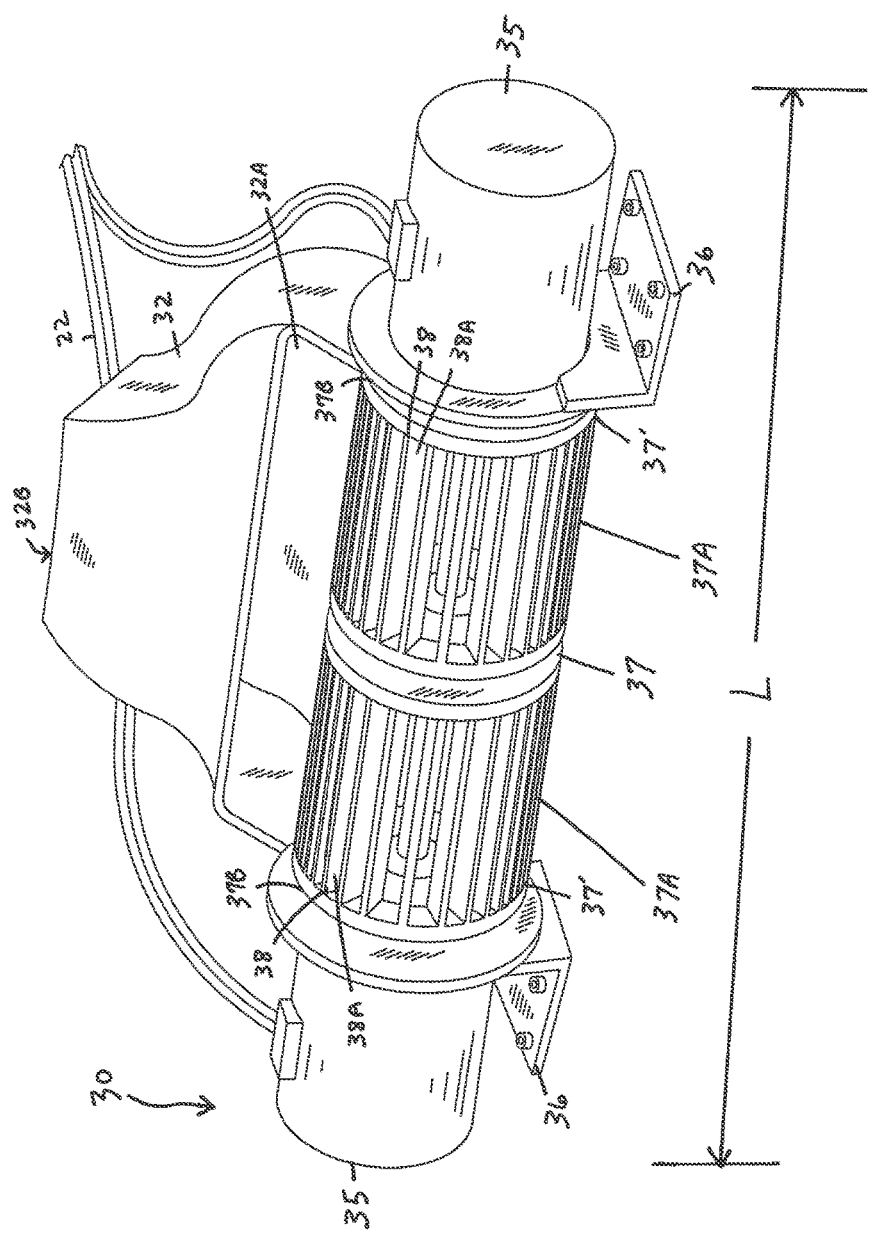
FIG. 4 is an enlarged view of one of the accumulator chargers shown in FIG. 2.
Figure 5:
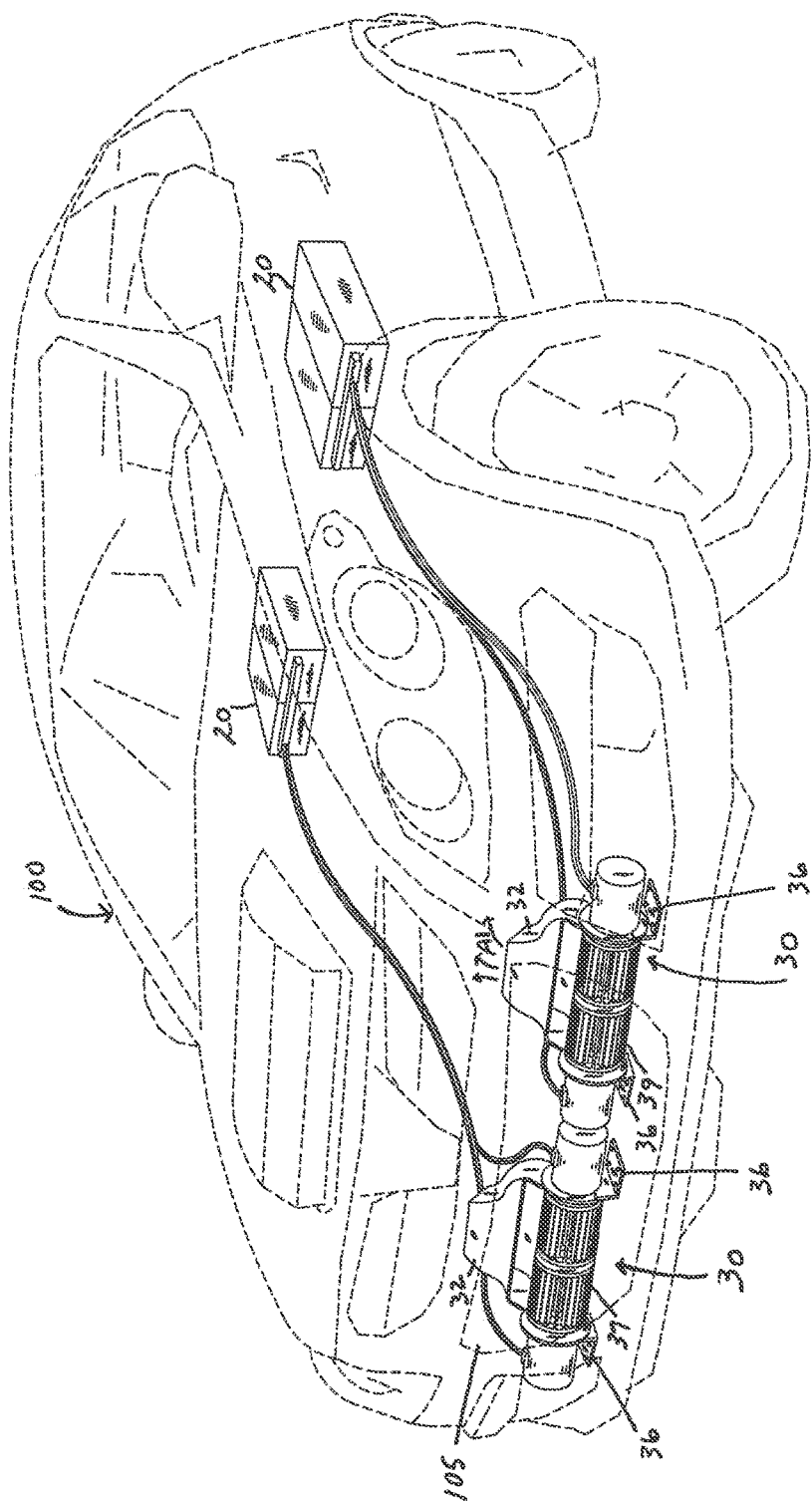
FIG. 5 is a front view of the present invention installed in a prior art vehicle shown in broken lines.
Figure 6:
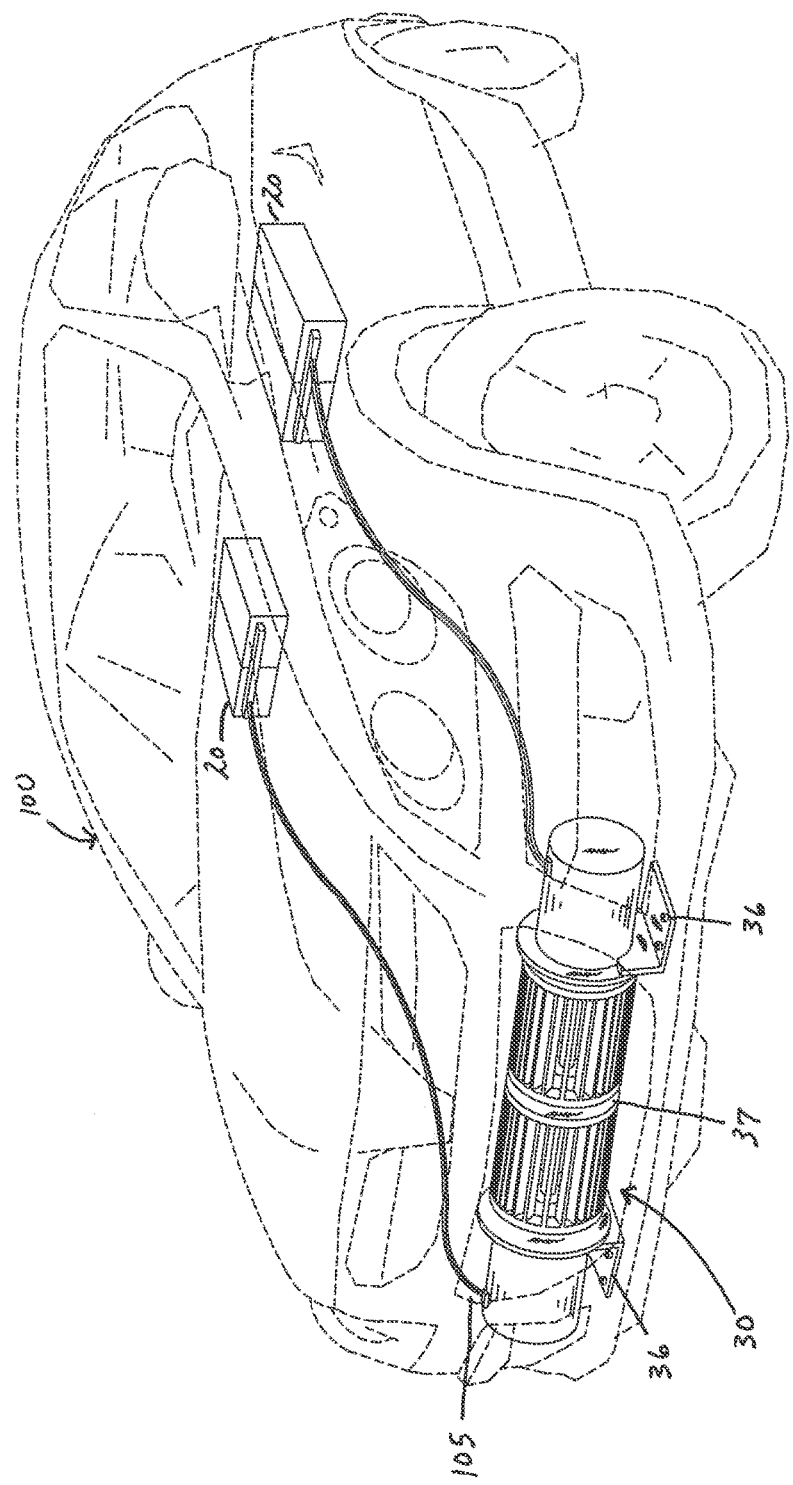
FIG. 6 is a front view of the present invention having a single accumulator charger installed to a prior art vehicle shown in broken lines.

Referring to FIGS. 4 and 5, the air induction turbines 37, 39 are preferably mounted at a front-end location of the vehicle 100, such as the vehicle's front grill 105 using brackets 36 disposed approximately adjacent each of the ends 37', 39'. Air flow A (FIG. 7) flowing in the direction D through the free-wheeling members 37A, 39A results in rotation of the free-wheeling members 37A, 39A and production of electricity as discussed above.

Generation of air flow A can be accomplished by driving the vehicle or by the vehicle facing a strong wind in the parked position. As such, the present invention can generate electric energy to the batteries 20 as described while the vehicle is moving, and when the vehicle is parked.

Figure 2:
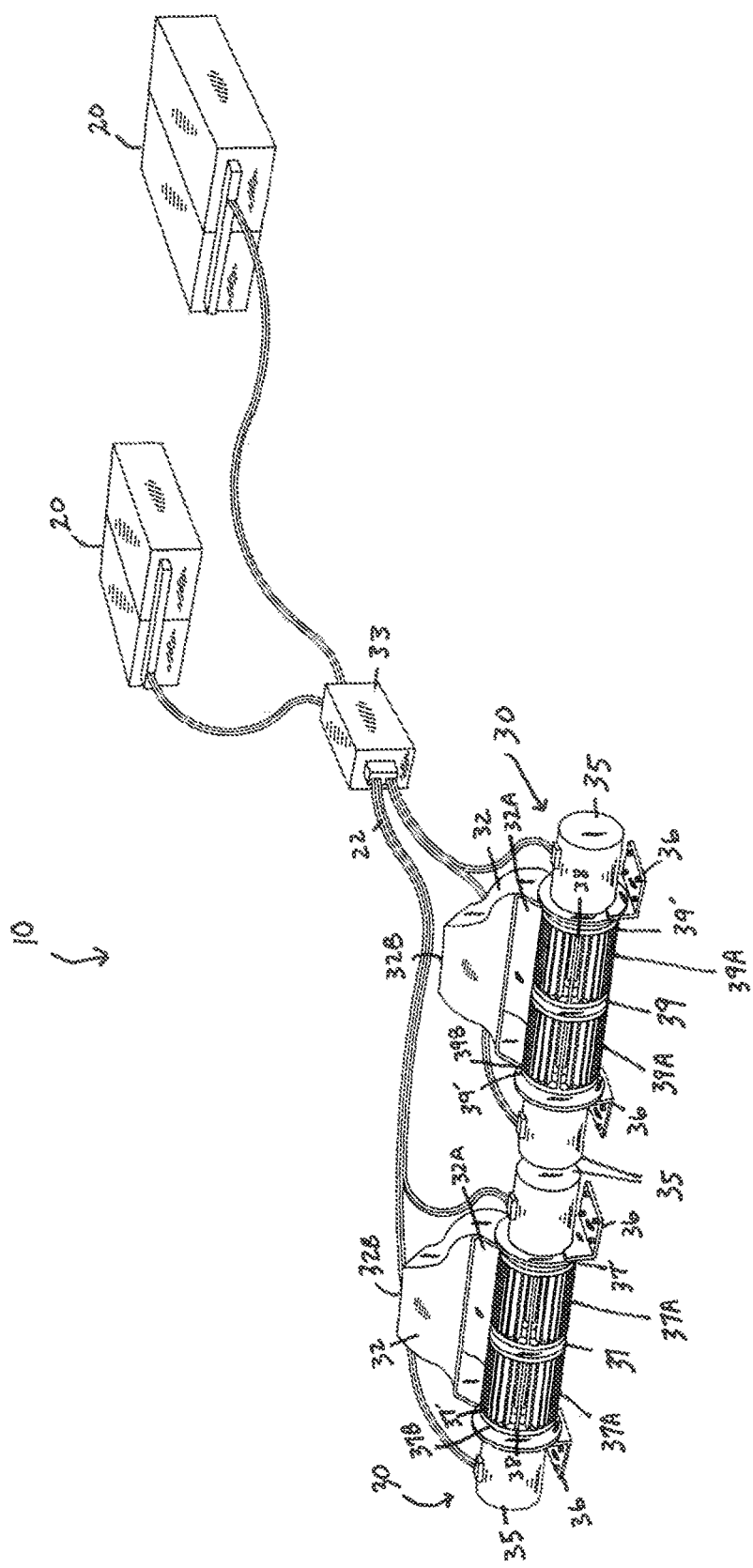
FIG. 2 shows the energy generating and storage system of FIG. 1 having a shroud for directing air flow.
Figure 7:
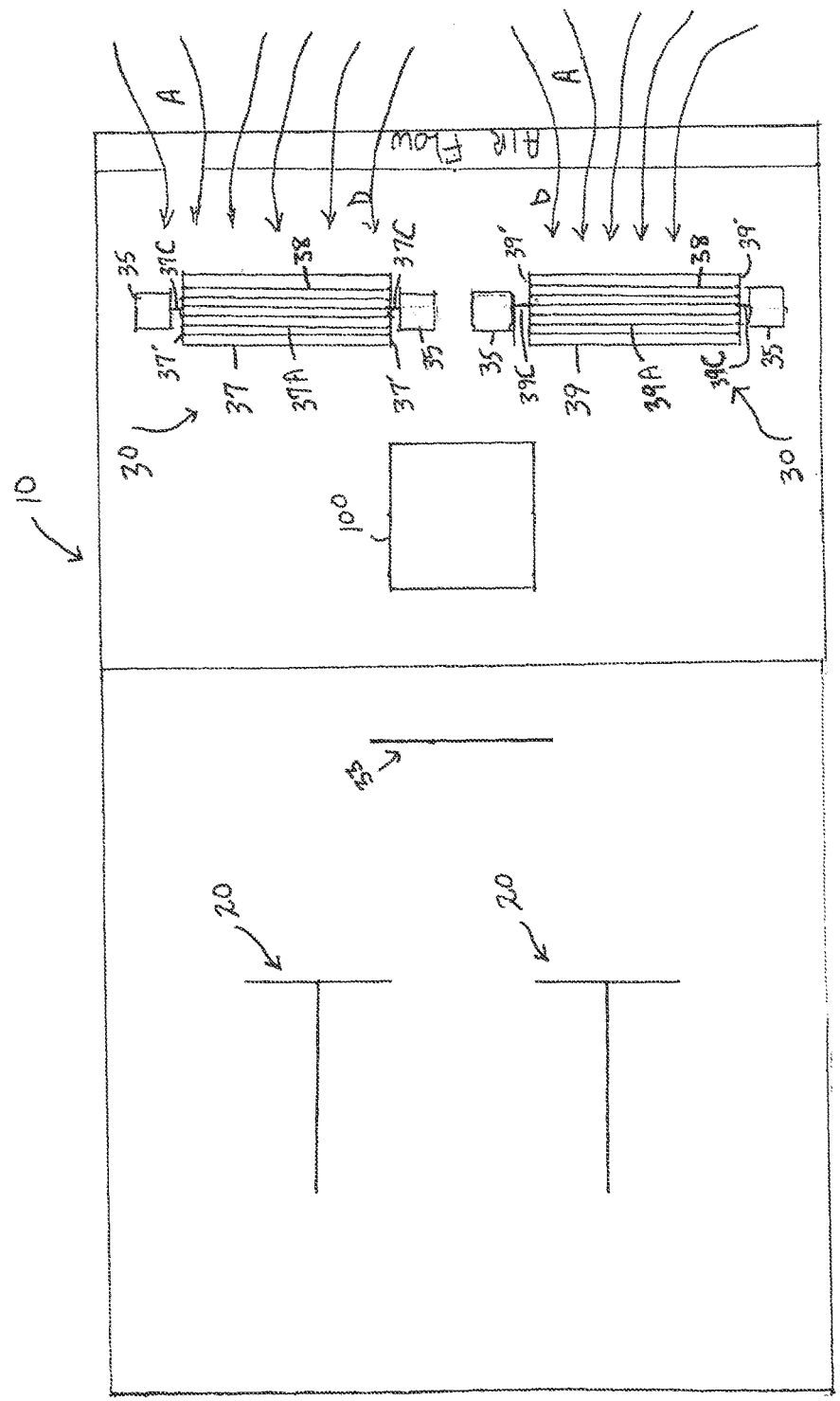
FIG. 7 is a diagrammatic illustration of the preferred embodiment of the present invention.

As illustrated in FIGS. 2, 4 and 7 each of the accumulator chargers 30 can further include a shroud 32 appropriately attached to the chargers 30. The shroud 32 configured to partially cover the free-wheeling members. The shroud 32 having a first opening 32A adjacent the free-wheeling members, and a second opening 32B that directs the air flow A1 (FIG. 5) generated by the rotating free-wheeling members within the vehicle's 100 engine compartment.

As shown in FIG. 3, the system 10 further includes an electronic energy storage controller 33 in electrical communication with the alternators or generators 35 and the at least one batteries 20. The electronic controller configured to selectively direct electrical energy from the alternators or generators 35 to one of the at least one batteries 20 such that when more than one battery is used as described, one of the at least one batteries 20 is being charged by the system while another of the plurality of batteries 20 is supplying driving energy to the vehicle's motor 100.

Accordingly, inasmuch as the kinetic energy can be converted to electric energy and accumulated in the batteries 20, the travel distance available from a single full charging of the battery can be increased so that the vehicle can run for a considerable distance battery charges from external sources, and without the need for supplemental or auxiliary gasoline.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

I claim:

1. An energy recovery and storage system for an electric vehicle, said system comprising:
at least one source of energy electrically connected to at least one charger, wherein each of the at least one chargers including a plurality of electrical generators for converting a mechanical energy to an electrical energy, and at least one induction turbine, each of said at least one induction turbines include at least one free-wheeling member that is in induction communication with said plurality of electrical generators, wherein each of said at least one free-wheeling members include a rotating member such that rotation of each of the rotating members produce said mechanical energy,
each of said rotating members including a plurality of vanes with each of said plurality of vanes having a planar surface that extend radially inwardly and is substantially coplanar to a length of said free-wheeling member, and an electronic controller in electrical communication with the electrical generators and the at least one source of energy, and
a shroud is fixed to the at least one charger, said shroud configured to direct airflow generated by said at least one free-wheeling member, and
wherein said shroud having a first opening adjacent said free-wheeling member, and a second opening that is fixed within the electric vehicle's engine compartment and directs said airflow within the electric vehicle's engine compartment.

2. The system as recited in claim 1, wherein said plurality of electrical generators comprise a first electrical generator disposed on a first end of each of the at least one turbines and a second electrical generator disposed on an opposite, second end of each of said at least one turbines.

3. The system as recited in claim 2, wherein said at least one charger includes brackets for mounting said at least one charger to a front-end location of an electric vehicle.

4. The system as recited in claim 3, wherein said brackets are disposed approximately adjacent said first and second ends.

5. The system as recited in claim 4, wherein said front-end location is the electric vehicle's front grill.

6. The system as recited in claim 1, wherein said shroud partially covers said free-wheeling member.

7. The system as recited in claim 1, wherein said at least one source of energy is at least one battery.

8. An energy recovery and storage system for an electric vehicle, said system comprising:

at least one source of energy electrically connected to at least one charger, wherein each of the at least one chargers including at least one electrical generator for converting a mechanical energy to an electrical energy, and at least one induction turbine, each of said at least one induction turbines include a rotating member that is in induction communication with said at least one electrical generator, wherein rotation of the rotating member produces said mechanical energy, said rotating member including a plurality of vanes with each of said plurality of vanes having a planar surface that is substantially coplanar to a length of said charger, brackets for attaching said at least one charger to an electric vehicle, and an electronic controller in electrical communication with the at least one electrical generator and the at least one source of energy, and a shroud fixed to the at least one charger, said shroud configured to direct airflow generated by said rotating member, wherein said shroud having a first opening adjacent said rotating member, and a second opening that is fixed in a position to direct said airflow within the electric vehicle's engine compartment.

9. The system as recited in claim 8, wherein a first electrical generator is disposed on a first end of said at least one turbine and a second electrical generator disposed on a second end of said at least one turbine.

10. The system as recited in claim 9, wherein said brackets configured for mounting said at least one charger to a front-end location of said electric vehicle.

11. The system as recited in claim 10, wherein said brackets are disposed approximately adjacent said first and second ends.

12. The system as recited in claim 11, wherein said front-end location is the electric vehicle's front grill.

13. The system as recited in claim 8, wherein said shroud partially covers said rotating member.

14. The system as recited in claim 8, wherein said at least one source of energy is at least one battery.

15. An energy recovery and storage system for an electric vehicle, said system comprising:

at least one battery electrically connected to at least one charger, a first electric generator disposed on a first end of said at least one charger and a second electric generator disposed on a second end of said at least one charger, said first and second electrical generators for converting a mechanical energy to an electrical energy, and at least one induction turbine, each of said at least one induction turbines include a rotating member configured to generate said mechanical energy and wherein said rotating member is in induction communication with said first and second electrical generators, said rotating member including a plurality of vanes with each of said plurality of vanes having a planar surface that is substantially coplanar to a length of said charger, brackets for attaching said at least one charger to an electric vehicle, and an electronic controller in electrical communication with the first and second electric generators and the at least one battery, and a shroud is fixed to the at least one charger, said shroud having a first opening adjacent said rotating member, and a second opening in communication with the electric vehicle's engine compartment such that said second opening direct said airflow within the electric vehicle's engine compartment.

* * * * *